(12) United States Patent
Buller et al.

(10) Patent No.: US 8,530,737 B2
(45) Date of Patent: Sep. 10, 2013

(54) ARRANGEMENT FOR SECURING ELONGATED SOLAR CELLS

(75) Inventors: Benyamin Buller, Cupertino, CA (US); Brian H. Cumpston, Pleasanton, CA (US); Tim Leong, Danville, CA (US)

(73) Assignee: Solyndra LLC, Fremont, CA (US)

( * ) Notice: Subject to any disclaimer, the term of this patent is extended or adjusted under 35 U.S.C. 154(b) by 554 days.

(21) Appl. No.: 11/934,267

(22) Filed: Nov. 2, 2007

(65) Prior Publication Data

US 2008/0110492 A1    May 15, 2008

Related U.S. Application Data

(60) Provisional application No. 60/859,033, filed on Nov. 15, 2006, provisional application No. 60/859,188, filed on Nov. 15, 2006, provisional application No. 60/859,212, filed on Nov. 15, 2006, provisional application No. 60/859,213, filed on Nov. 15, 2006, provisional application No. 60/859,215, filed on Nov. 15, 2006, provisional application No. 60/861,162, filed on Nov. 27, 2006, provisional application No. 60/901,517, filed on Feb. 14, 2007.

(51) Int. Cl.
    *H01L 31/042* (2006.01)

(52) U.S. Cl.
    USPC .......................... 136/251; 136/244

(58) Field of Classification Search
    USPC ................ 136/243–265; 52/173.3
    See application file for complete search history.

(56) References Cited

U.S. PATENT DOCUMENTS

| 2,396,725 | A |   | 3/1946 | Thomas |
|-----------|---|---|--------|--------|
| 4,043,315 | A |   | 8/1977 | Cooper |
| 4,101,101 | A |   | 7/1978 | Barkats et al. |
| 4,132,570 | A |   | 1/1979 | Caruso et al. |
| 4,153,476 | A | * | 5/1979 | Frosch et al. ................ 136/246 |
| 4,283,106 | A |   | 8/1981 | Bunnell |
| 4,537,838 | A |   | 8/1985 | Jetter et al. |
| 4,540,843 | A |   | 9/1985 | Gochermann et al. |
| 4,571,446 | A |   | 2/1986 | Yamazaki |
| 4,663,495 | A |   | 5/1987 | Berman et al. |
| 4,832,001 | A |   | 5/1989 | Baer |
| 4,913,744 | A |   | 4/1990 | Hoegl et al. |

(Continued)

FOREIGN PATENT DOCUMENTS

| JP | 59125670 | 7/1984 |
| JP | 60187066 | 9/1985 |

(Continued)

OTHER PUBLICATIONS

USPTO partial translation of JP 59-125670, p. 304, Mar. 23, 2010.*

(Continued)

*Primary Examiner* — Kevin P Kerns
*Assistant Examiner* — Kevin E Yoon
(74) *Attorney, Agent, or Firm* — Morgan, Lewis & Bockius LLP

(57) ABSTRACT

A solar panel apparatus includes a set of photovoltaic modules. The modules are configured to photovoltaically generate electricity from light. Each module is elongated along an axis and has first and second axially opposite ends. An end rail has a groove into which the first end of each module is potted in place with potting material.

19 Claims, 8 Drawing Sheets

(56) References Cited

U.S. PATENT DOCUMENTS

| | | | |
|---|---|---|---|
| 5,538,563 | A | 7/1996 | Finkl |
| 5,590,495 | A | 1/1997 | Bressler et al. |
| 5,597,631 | A | 1/1997 | Furumoto et al. |
| 5,603,627 | A | 2/1997 | Evanisko |
| 5,646,397 | A | 7/1997 | Wenham et al. |
| 5,762,720 | A * | 6/1998 | Hanoka et al. .................. 136/251 |
| 5,990,413 | A | 11/1999 | Ortabasi |
| 6,150,602 | A | 11/2000 | Campbell |
| 6,201,180 | B1 | 3/2001 | Meyer et al. |
| 6,235,984 | B1 | 5/2001 | Wambach et al. |
| 6,465,724 | B1 | 10/2002 | Garvison et al. |
| 6,515,217 | B1 * | 2/2003 | Aylaian .......................... 136/246 |
| 6,528,718 | B2 * | 3/2003 | Yoda et al. ..................... 136/251 |
| 7,121,884 | B2 | 10/2006 | Osada |
| 2005/0098202 | A1 | 5/2005 | Maltby |
| 2005/0199278 | A1 | 9/2005 | Aschenbrenner |
| 2005/0217664 | A1 | 10/2005 | Patterson |
| 2006/0118163 | A1 | 6/2006 | Plaisted et al. |
| 2006/0243318 | A1 | 11/2006 | Feldmeier et al. |
| 2006/0288852 | A1 | 12/2006 | Zinell et al. |
| 2007/0102038 | A1 | 5/2007 | Kirschning |
| 2007/0227579 | A1 | 10/2007 | Buller et al. |
| 2008/0110487 | A1 | 5/2008 | Truman et al. |
| 2008/0113567 | A1 | 5/2008 | Buller et al. |
| 2009/0120486 | A1 | 5/2009 | Buller |

FOREIGN PATENT DOCUMENTS

| | | |
|---|---|---|
| JP | 07312441 | 11/1995 |
| JP | 09135039 | 5/1997 |
| JP | 11330523 | 11/1999 |
| JP | 2000 294821 | 10/2000 |
| JP | 2007 250857 | 9/2007 |
| WO | WO 2005/029657 | 3/2005 |
| WO | WO 2005/078806 | 8/2005 |
| WO | WO 2007/002110 | 1/2007 |

OTHER PUBLICATIONS

JPO machine translation of JP 2000-294821, Oct. 20, 2000.*
International Search Report, issued Aug. 21, 2008, for PCT/2007/023840.
International Search Report, issued Aug. 21, 2008, for PCT/2007/023842.
International Search Report, issued Aug. 21, 2008, for PCT/2007/023843.
U.S. Appl. No. 11/934,247, filed Nov. 2, 2007.
Office Action issued by USPTO on Nov. 10, 2010 for U.S. Appl. No. 11/934,247.
Office Action issued by USPTO on Aug. 2, 2010 for U.S. Appl. No. 11/934,327.
Office Action issued by USPTO on Aug. 20, 2010 for U.S. Appl. No. 11/934,295.
English machine translation of WO 2005/078806, Aug. 25, 2005.
Office Action, issued Nov. 24, 2010 by USPTO, for U.S. Appl. No. 11/934,327.
Office Action, issued Dec. 7, 2010 by USPTO, for U.S. Appl. No. 11/934,295.
Manual translation, commissioned by Applicants, of Description section of WO 2005/078806.
Office Action issued by USPTO on Jul. 20, 2010 for U.S. Appl. No. 11/934,247.
English translation of WO 2005/029657, Mar. 31, 2005.
English translation of Japanese Patent Application Publication JP 2000-294821.
English translation of Japanese patent Application Publication JP 59-125670.
English translation of Japanese patent Application Publication JP 60-187066.

* cited by examiner

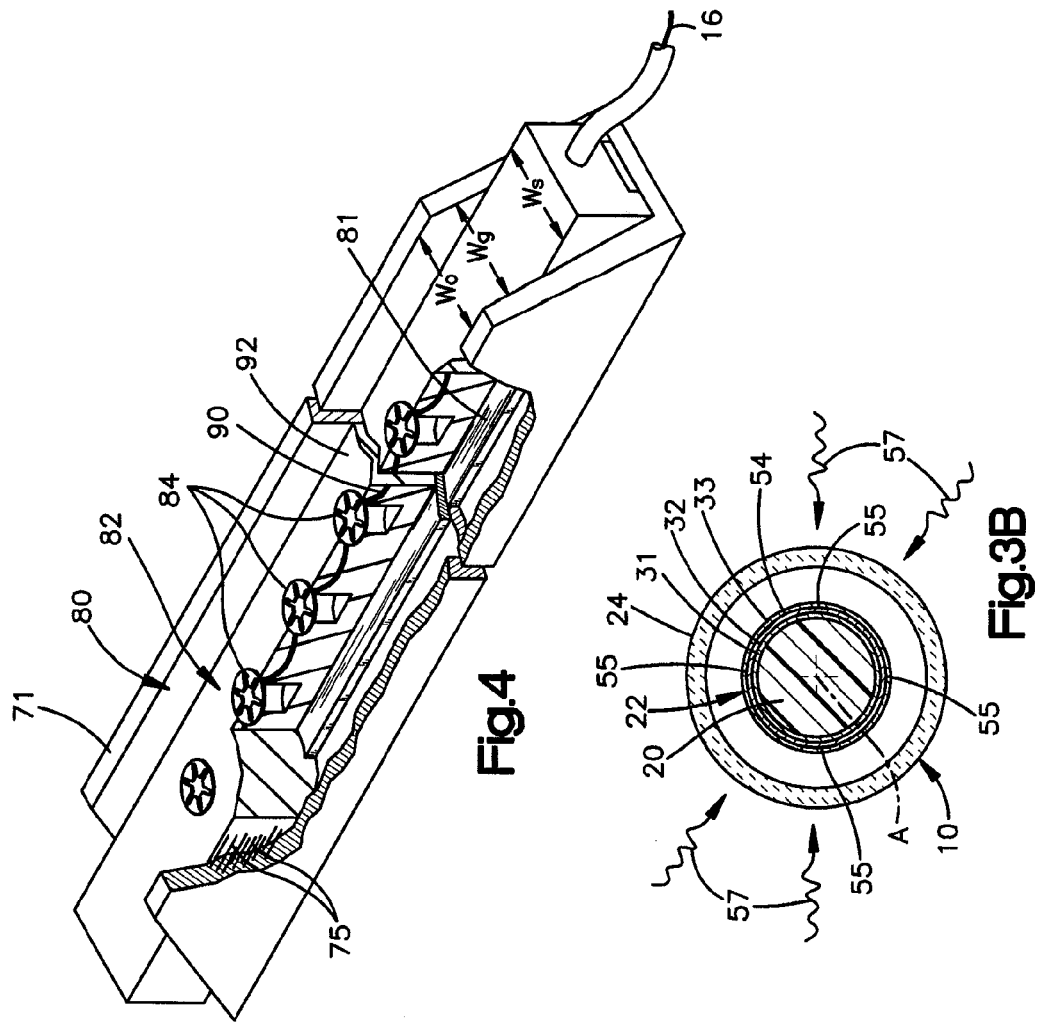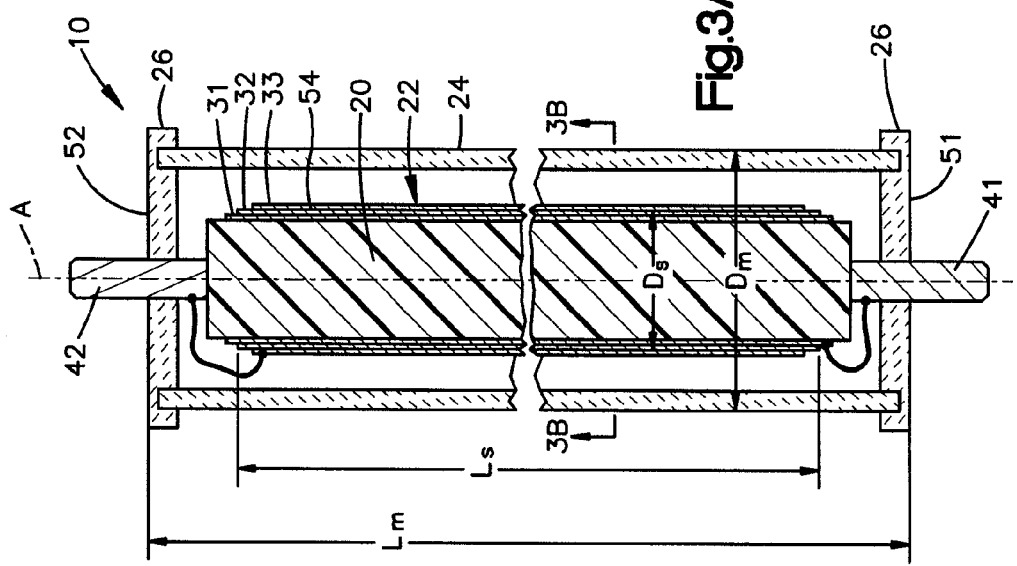

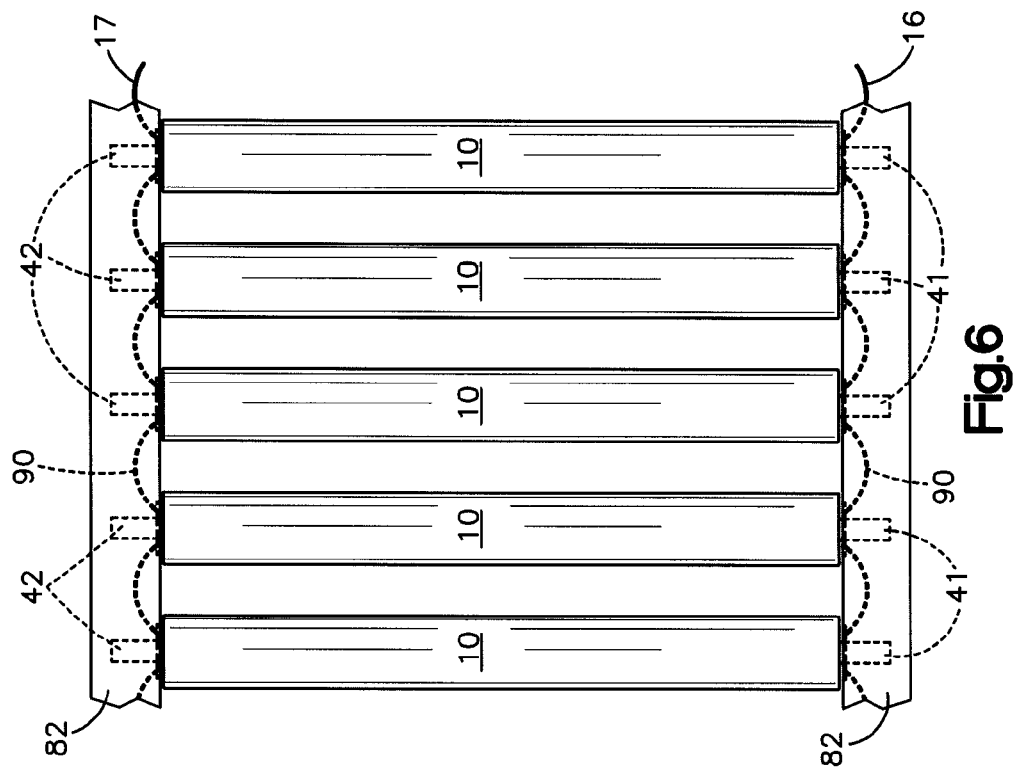
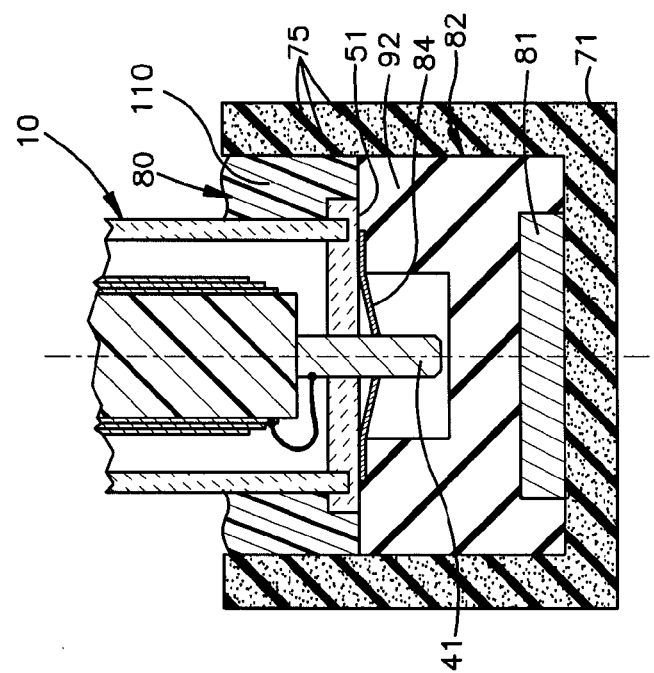

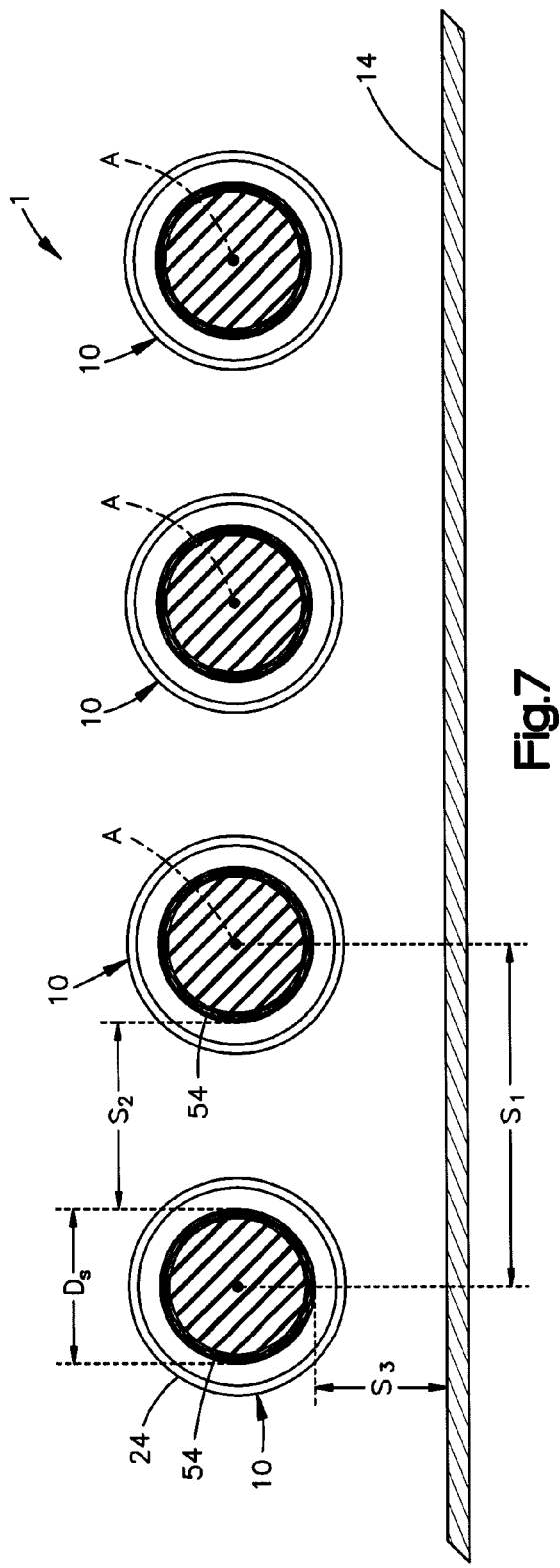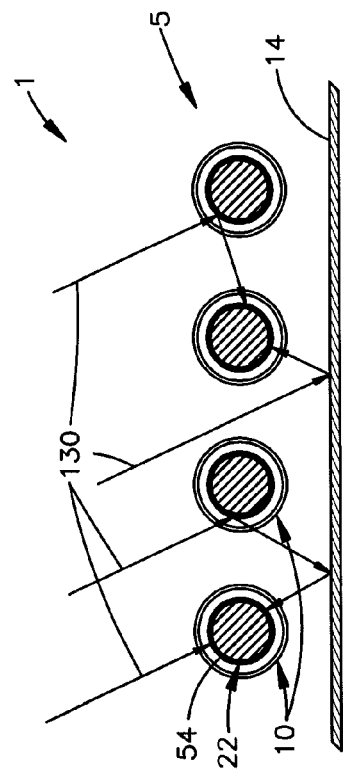

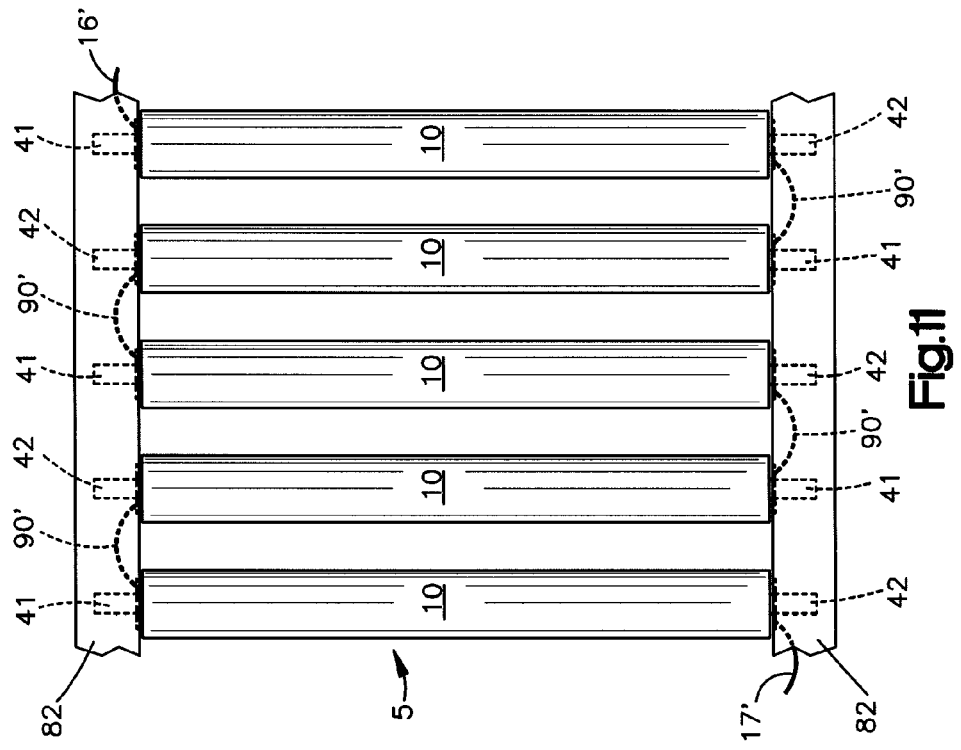
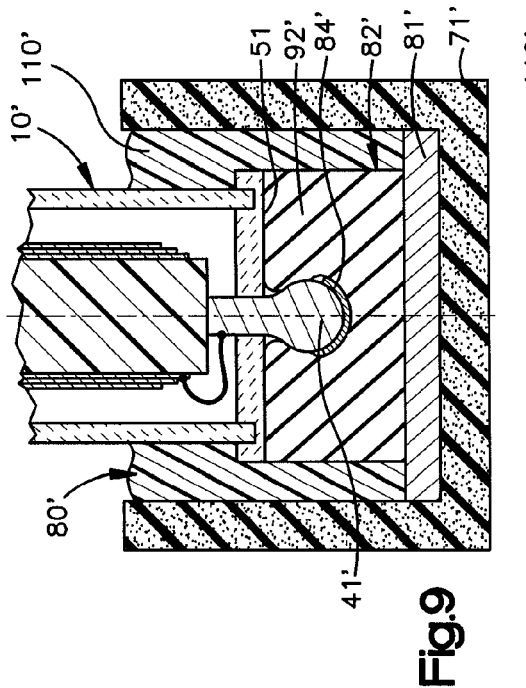
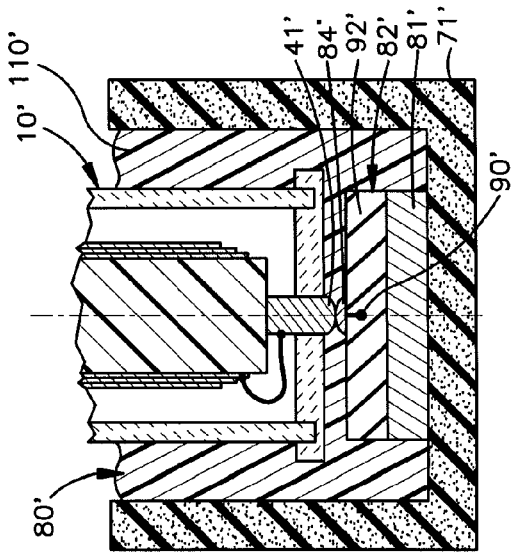

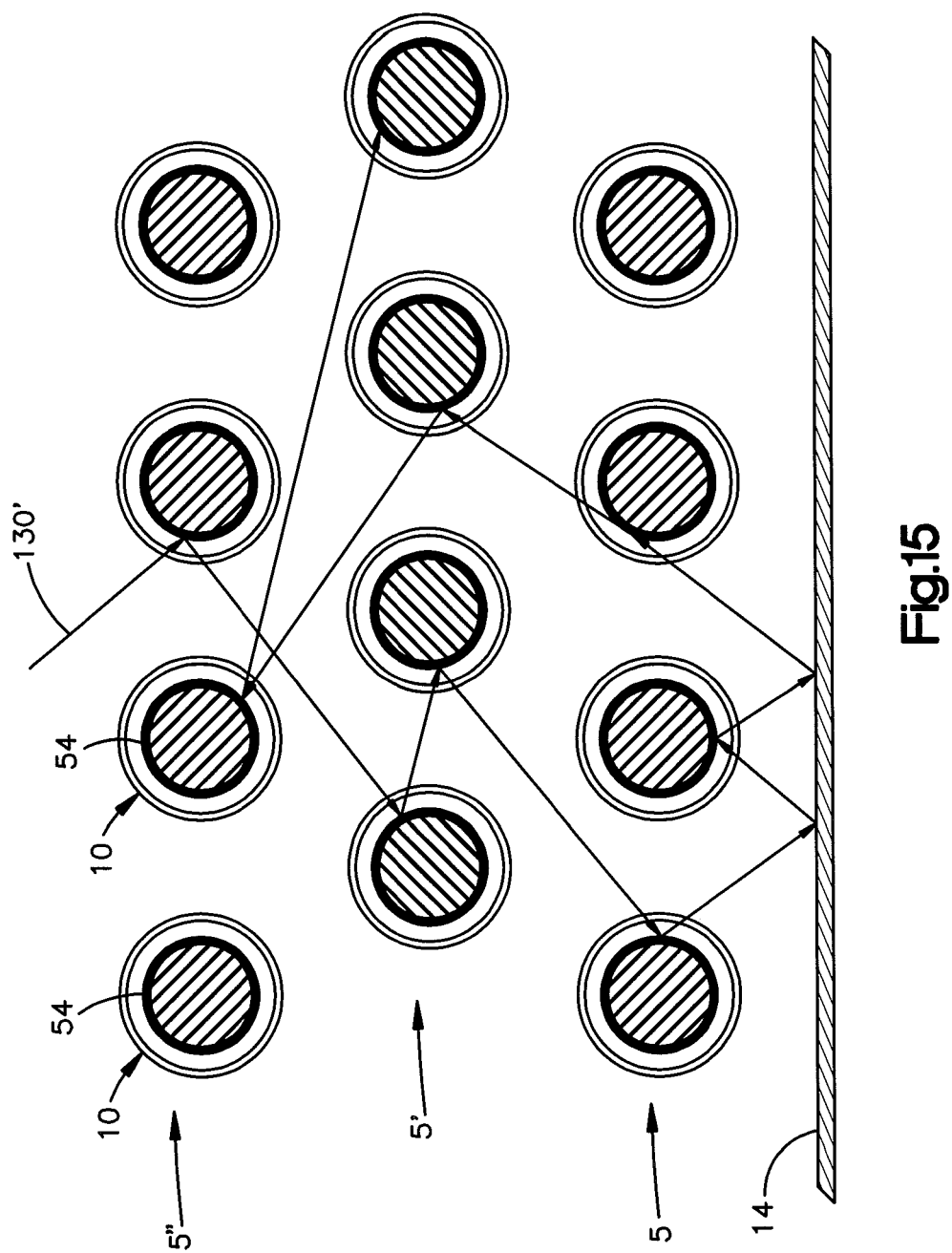

ARRANGEMENT FOR SECURING ELONGATED SOLAR CELLS

CROSS-REFERENCE TO RELATED APPLICATION

This claims the benefit of U.S. Provisional Application Nos. 60/859,033, 60/859,188, 60/859,212, 60/859,213 and 60/859,215, all filed Nov. 15, 2006; and 60/861,162, filed Nov. 27, 2006; and 60/901,517, filed Feb. 14, 2007; all seven provisional applications hereby incorporated by reference.

TECHNICAL FIELD

This application relates to solar panels.

BACKGROUND

A solar panel includes an array of photovoltaic modules that are electrically connected to output terminals. The modules output electricity through the terminals when exposed to sunlight.

BRIEF DESCRIPTION OF THE DRAWINGS

FIG. 3A is a sectional view of an exemplary one of the modules.

FIG. 3B is a sectional view taken at line 3B-3B of FIG. 3A.

FIG. 4 is a perspective view of a rail of the frame.

FIG. 5 is a sectional view showing interconnecting parts of the module and the rail.

FIG. 6 is a top view of the array, showing electrical lines connecting the modules in parallel.

FIG. 7 is a side sectional view of the array, showing the spatial relationship of the modules to each other and to a reflective backplate.

FIG. 8 is a sectional view similar to FIG. 7, showing the array exposed to sunlight.

FIG. 9 is a sectional view similar to FIG. 5, with an alternative configuration of the interconnecting parts of the module and the rail.

FIG. 10 is a sectional view similar to FIGS. 5 and 9, showing another alternative configuration of the interconnecting parts of the module and the rail.

FIG. 11 is a top view similar to FIG. 6, showing electrical lines connecting the modules in series.

FIG. 15 is a sectional view of a two-dimensional array of the modules.

DESCRIPTION

First Embodiment

Figure 1:
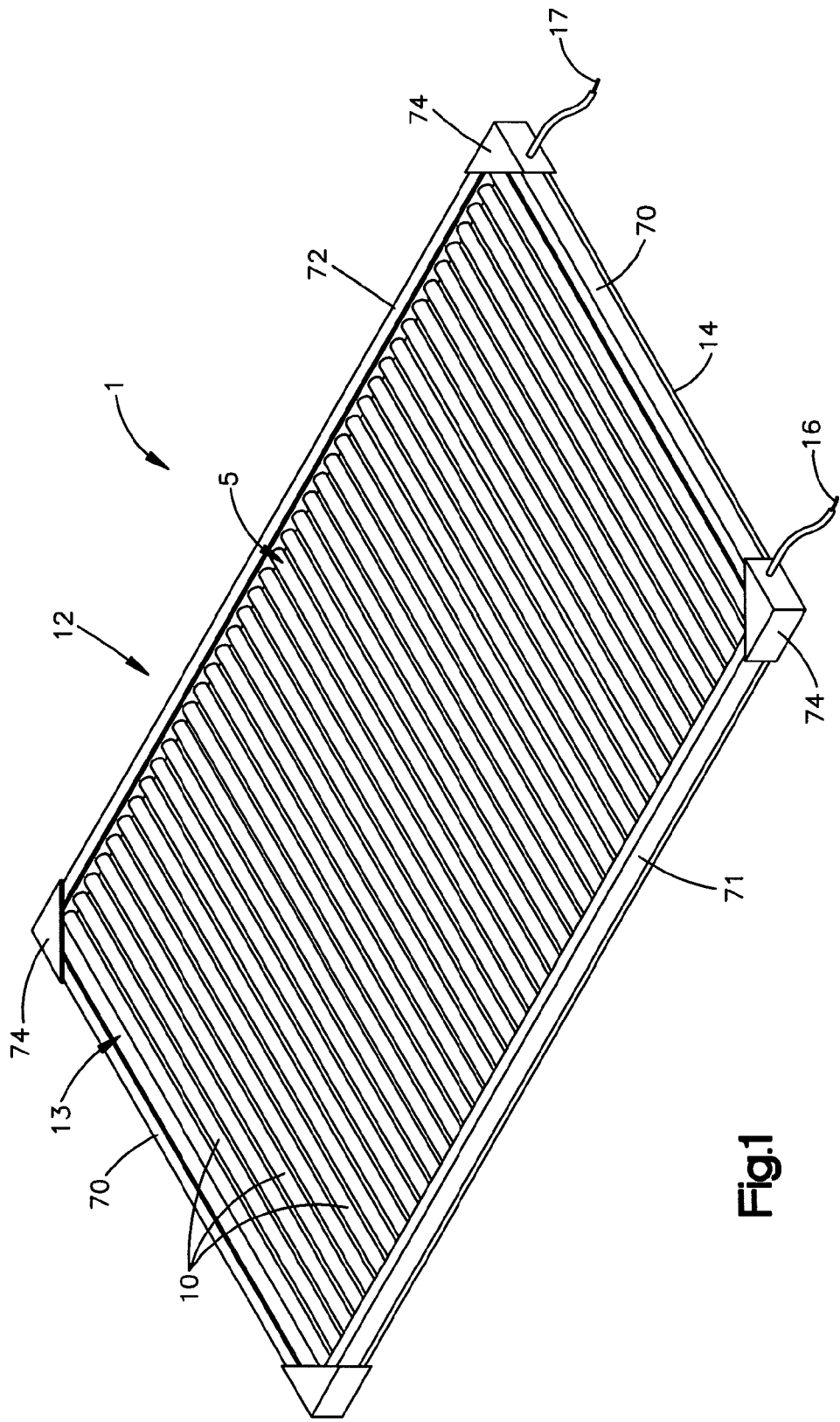
FIG. 1 is a perspective view of a solar panel, including a one-dimensional array of photovoltaic elongated photovoltaic modules mounted in a frame.
Figure 2:
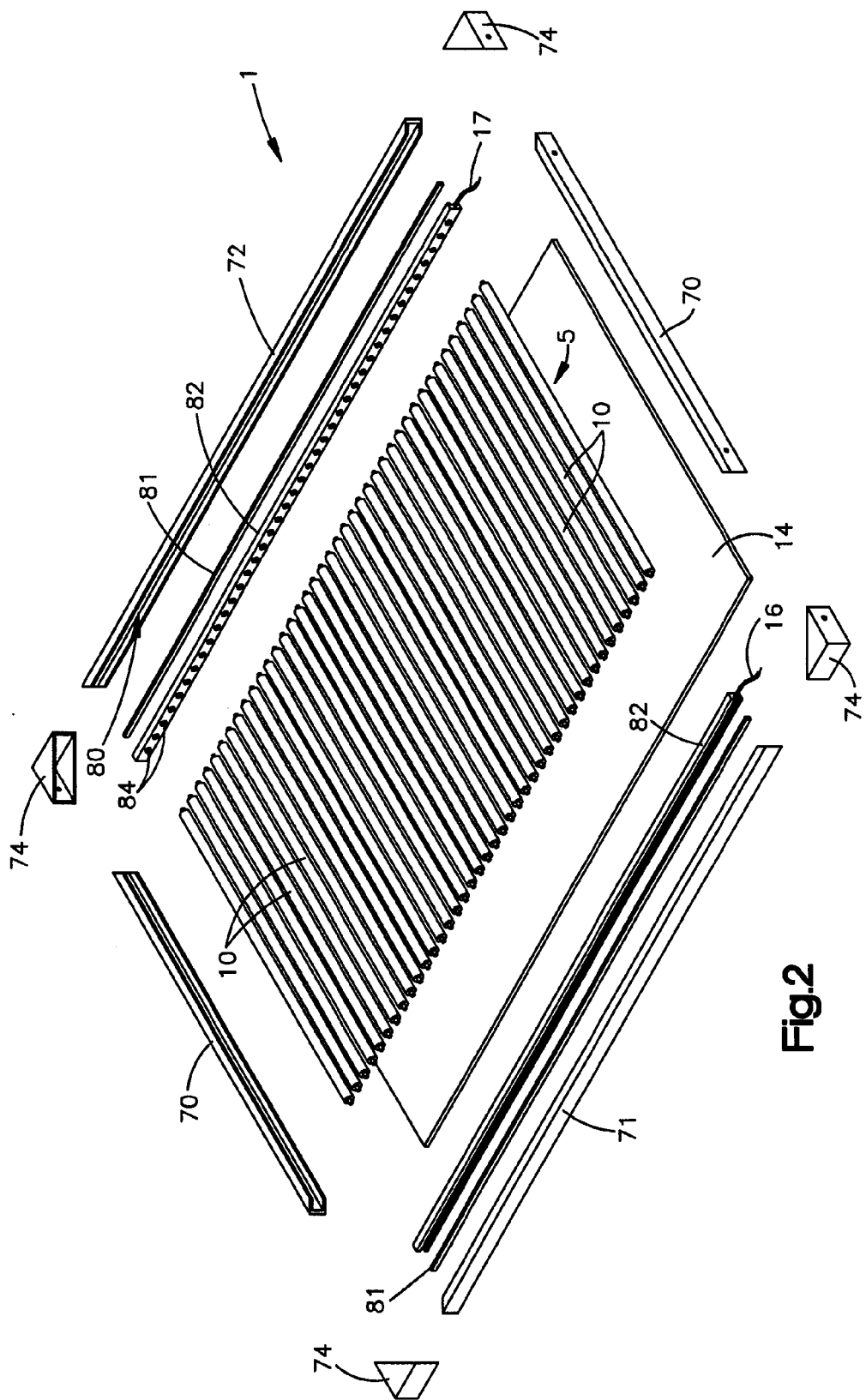
FIG. 2 is an exploded view of the panel.

The apparatus shown in FIGS. 1-2 has parts that are examples of the elements recited in the claims. These examples enable a person of ordinary skill in the art to make and use the invention and include best mode without imposing limitations not recited in the claims. Features from different embodiments described below can be combined together into one embodiment in practicing the invention without departing from the scope of the claims.

The apparatus is a solar panel 1. It includes a one-dimensional array 5 of parallel elongated photovoltaic modules 10. The modules are secured in a frame 12 with potting material 110 (FIG. 5). The frame 12 has a front opening 13 configured to receive sunlight. The photovoltaic modules 10 output electricity through two outlet terminals 16 and 17 when exposed to light.

The modules 10 can be identical. As exemplified by a module 10 shown in FIGS. 3A-3B, each module 10 can include a core 20 centered on an axis A. The core 20 can be surrounded by a photovoltaic cell 22 extending fully about the axis A. The cell 22 can itself be surrounded by a transparent protective tube 24 capped by two axially opposite caps 26. The photocell 22 typically has three layers—a radially inner conductive layer 31 overlying the core 20, a middle semiconductor photovoltaic layer 32, and a transparent conductive radially outer layer 33. The inner and outer layers 31 and 33 are typically connected to an anode output contact 41 and a cathode output contact 42 at the axially opposite ends 51 and 52 of the cell 22.

As shown in FIGS. 3A-3B, the photovoltaic middle layer 32 has a photovoltaic surface 54 that receives light to photovoltaically generate electricity. The electricity is conducted through the conductive layers 31, 33 to be output through the contacts 41, 42. The photovoltaic surface 54 in this example is cylindrically tubular. It thus includes an infinite number of contiguous surface portions 55, each facing away from the axis A in a different direction. These include, with reference to FIG. 3B, the four orthogonal directions up, down, left and right. Therefore, the cell 32 in this example, and thus the module 10, can photovoltaically generate electricity from light (exemplified by arrows 57) directed toward the module 10 from any radially-inward (i.e., toward the axis A) direction.

The length $L_s$ of the photovoltaic surface 54 is greater than, and preferably over five times or over twenty times greater than, the diameter $D_s$ of the photovoltaic surface 54. Similarly, the length $L_m$ of the module 10 is greater than, and preferably over five times or over twenty times greater than, the diameter $D_m$ of the diameter of the module 10. The module's length and diameter in this example correspond to the lengths and diameter's of the module's outer tube 26.

As shown in FIG. 1, the frame 12 is a securing structure that includes two axially-extending side rails 70 and laterally-extending first and second end rails 71 and 72. In this example, the rails 70, 71 and 72 are held together by corner brackets 74. The end rails 71, 72 rigidly secure the modules 10 in place and are themselves rigidly secured together by the side rails 70.

The rails 70, 71, 72 can be extruded and stocked in long lengths from which shorter lengths can be cut to match the individual length needed for each application. To simplify warehousing and manufacturing, the side rails 70 can be cut from the same stock material as the end rails 71, 72.

The rails 70, 71, 72 can be formed of fiber reinforced plastic, such as with pultruded fibers 75 extending along the full length of the rail as illustrated by the first end rail 71 in FIG. 4. The fibers 75 resist stretching of the rail 71 to help maintain the preset center spacing of the modules 10 while enabling flexing of the respective rail. Examples of pultruded fibers are glass fibers and organic fibers such as aramid and carbon fibers, and compound materials.

The end rails 71, 72 in this example are identical, and described with reference to the first end rail 71 in FIG. 4. The end rail 71 has a laterally extending groove 80. A stiffening bar 81 can be adhered to the bottom surface of the groove 80 to stiffen the rail 71. The bar 81 in this example is narrower than the groove 80.

A socket strip 82 in the groove 80 can be adhered to both the top of the bar 81 and the bottom of the groove 80. The socket strip 82 in this example contains a chain of metal socket contacts 84 interconnected by an electrical bus line 90, all overmolded by a rubber sheath 92. The sheath 92 can electrically insulate the bus line 90 and secure the socket contacts 84 in place at a predetermined center spacing. The rail 71 accordingly contains the strip 82, and thus also the sockets 84 and electrical lines 90 of the strip 82. The width $W_s$ of the strip 82 can approximately equal the width $W_g$ of the groove 80 so as to fit snugly in the groove 80.

The sheath 92 can be flexible, and even rubbery, to reduce stress in the modules 10 and facilitate manipulation when being connected to the modules 10 or inserted into the rail 71. If sufficiently flexible, the sheath 92 can be manufactured in long lengths and stocked in a roll. Shorter lengths can be cut from the roll as needed, to match the length and number of sockets 84 needed for each application. Even if made flexible, the sheath 92 is preferably substantially incompressible and inextensible to maintain the center spacing of the modules 10. The sheath 92 can alternatively be rigid to enhance rigidity of the rail 71 or have rigid and flexible portions.

As illustrated with reference to one end 51 of one module 10 shown in FIG. 5, each electrical contact 41, 42 of each module 10 can be both electrically coupled to and mechanically secured by a corresponding socket contact 84. Potting material 110 can fill the groove 80 to encase the contacts 41, 84 and form a seal with each module 10 fully about the module 10. This can isolate and hermetically seal the socket contacts 84 and module contacts 41, 42 from environmental air, moisture and debris, and further isolate any electrical connection between the device and the frame. The potting material 110 further adheres to each module 10 to secure the module 10 in place and stiffens the orientation of the ends 51, 52 of each module 10. Bowing of the module 10 from gravity and vibration is less than it would be if its ends 51, 52 were free to pivot about the socket 84. The reduction in bowing reduces the chance of the modules 10 breaking or contacting each other and helps maintain the predetermined center spacing of the modules 10.

As shown in FIG. 6, the electrical line 90 in the first end rail 71 connects all the module anodes 41 to the common anode terminal 16. The electrical line 90 in the second end rail 72 connects all the module cathodes 42 to the common cathode terminal 17. The modules 10 are thus connected in parallel.

The frame 12 can be mounted in front of a reflective backplate 14. The backplate 14 has a reflective surface such as a mirror surface or white coating, and is preferably parallel with the module axes A.

In the assembled panel 1 shown in FIG. 7, the center spacing $S_1$ between modules 10 equals the diameter $D_s$ of the photovoltaic surface 54 plus the spacing $S_2$ between adjacent photovoltaic surfaces 54. The spacing $S_2$ is about 0.5 to about 2 times the diameter $D_s$. The spacing $S_3$ between each photovoltaic surface 54 and the reflective surface 14 is preferably about 0.5 to about 2 times the diameter $D_s$.

FIG. 8 shows the panel 1 exposed to sunlight 130. As shown, the light 130 can strike each photocell 22 in multiple ways. Light passing through the array 5, between photocells 22, is reflected by the reflective surface 14 back toward the array 5 to strike one of the photocells 22. The light can also reflect off one cell 22 to strike a neighboring cell 22.

Potting and Encapsulation Material

Encapsulants and potting compounds are resins or adhesives that are used to encapsulate circuit boards and semiconductors, fill containers of electronic components, and infiltrate electrical coils. They provide environmental protection, electrical insulation and other specialized characteristics. In most embodiments in accordance with the present application, encapsulants and potting materials are used as adhesive, insulation, bonding agents, encapsulating coating, sealant or gap filling agent to enhance the mechanical integrity of the final solar cell assembly. Encapsulants and potting compounds belong to a broader category of electrical resins and electronic compounds that includes adhesives, greases, gels, pads, stock shapes, gaskets, tapes, and thermal interface materials. Most potting compounds are based on polymeric resins or adhesives; however, materials based on ceramic or inorganic cements are often used in high temperature applications. Some encapsulants and potting compounds are designed to form a thermally conductive layer between components or within a finished product. For example, these thermally conductive products are used between a heat-generating electrical device and a heat sink to improve heat dissipation.

Important specifications for encapsulants and potting compounds include electrical, thermal, mechanical, processing, and physical properties. Electrical properties include electrical resistivity, dielectric strength, and dielectric constant or relative permittivity. Thermal properties include service temperature, thermal conductivity, and coefficient of thermal expansion (CTE). Mechanical properties include flexural strength, tensile strength, and elongation. Processing and physical properties include viscosity, process or curing temperature, process or cure time, and pot life. Encapsulants and potting compounds vary in terms of features. Many products that are designed for electrical and electronics applications provide protection against electrostatic discharge (ESD), electromagnetic interference (EMI), and radio frequency interference (RFI). Materials that are electrically conductive, resistive, insulating, or suitable for high voltage applications are also available. Flame retardant products reduce the spread of flames or resist ignition when exposed to high temperatures. Thermal compounds and thermal interface materials that use a phase change are able to absorb more heat from electronic devices or electrical components. In some embodiments, it is necessary to select encapsulants and potting compounds for solar cell assembly based on the geographic location where the solar cell assembly is to be installed. In some embodiments, encapsulants and potting compounds are selected based on multiple factors such as temperature, rainfall level and snowfall level of the location.

In some embodiments, common potting compounds and casting resins are used to fill, for example, the grooves 80 of the end rails 71 and 72. Potting material is use to secure members of a given solar cell assembly, for example, to secure the stiffening bar 81 to the bottom or sides of the grooves 80, or to the inner or outer surface of the end rail 71 or 72. In some embodiments, encapsulants are used to seal or cover electrical connections. In typical embodiments, encapsulant layers are less than 10 millimeters thick. In some embodiments, gap filling or underfill compounds are used to fill in gaps or spaces between two surfaces to be bonded or sealed, for example, the stiffening bar 81 to the bottom or sides of the grooves 80, or to the inner or outer surface of the end rail 71 or 72. Encapsulants and potting compounds are based on a variety of chemical systems. Examples of potting and encapsulant materials include but are not limited to, for example, Acrylic/Polyacrylate (excellent environmental resistance and fast-setting times compared to other resin systems), Bitumen/Coal Tar (water resistance and low cost), Bismaleimide (BMI) (high temperature resistance), Cellulosic/Cellulose, Ceramic/Inorganic Cement, Epoxy (high strength and low shrinkage during curing, toughness and resistance to chemical and environmental damage), Fluoropolymer (e.g., PTFE/PVDF for superior chemical resistance and low friction), Isoprene/Polyisoprene, Liquid Crystal Polymer (LCP, high strength and temperature resistance), Phenolics/Formaldehyde Resins (e.g., Melamine, Furan, etc., thermosetting molding compounds and adhesives that offer strong bonds and good resistance to high temperatures and corrosion), Polyamide (e.g., Nylon as one example of strong hot-melt adhesives), Polyamide-imide (PAI) (excellent mechanical properties), Polybutadiene (e.g., for dielectric potting compounds and coatings), Polycarbonate (PC) (amorphous with excellent impact strength, clarity, mechanical and optical properties), Polyethylene (PE), PET/PBT (Thermoplastic Polyester), Polyester/Vinyl Ester, Polyolefin, Polypropylene (PP), Polypropylene (PP) (hot-melt adhesive systems), Polysulphide, Polyurethane (PU, PUR), Silicone, Styrene/Polystyrene, and Vinyl (e.g., PVC/PVA/PVDC).

In some embodiments, polymers or resins used as potting and encapsulant materials may be cured using various technologies that include thermoplastic/hot melt methods, thermosetting methods (e.g., cross-linking/vulcanizing), room temperature based methods (e.g., curing/vulcanizing), UV/radiation based methods, and reactive/moisture based methods. Polymers or resins used as potting and encapsulant materials may also be cured in a single component system, a two component system or even a multi-component system.

Companies specialized in polymers or resins used as potting and encapsulant materials and associated technologies include but are not limited to DYMAX Corporation (Torrington, Conn.), GC Electronics (Rockford, Ill.), Gelest, Inc. (Morrisville, Pa.), GS Polymers, Inc. (Brea, Calif.), Henkel Corporation-Electronics (Irvine, Calif.), Hernon Manufacturing, Inc. (Sanford, Fla.), ITW Polymer Technologies-Insulcast Division (Montgomery, Pa.), Master Bond, Inc. (Hackensack, N.J.), National Starch and Chemical Co. (Bridgewater, N.J.) and Sauereisen, Inc. (Pittsburgh, Pa.).

Method of Assembly

Referring to FIG. 2, one method of assembling the panel 10 includes the following sequence of steps. First, the stiffening bars 81 and socket strips 82 are secured in the grooves 80 of the respective rails 71, 72. Then, the anode contacts 41 (FIG. 3A) of the modules 10 are connected to the socket strip 82 in the first end rail 71, and the cathode contacts 42 of the modules 10 are connected to the socket strip 82 in the second end rail 72. The side rails 70 are connected to the end rails 71, 72 with the four corner brackets 74. In a potting step, the potting material 110 (FIG. 5) is flowed into each groove 80, to encase the respective socket strip 82, and then hardened. The reflective surface 14 is fixed to the back of the framed 12. The output terminals 16, 17 can then be connected to an electrical device to power the device when the modules 10 are exposed to light.

In an alternative method, the socket strips 82 are connected to the modules 10 before being mounted in the grooves 80, so that the socket strips 82 are more easily manipulated when connecting to the modules 10.

Alternative Embodiments

In the figures cited below, parts labeled with primed and multiply-primed reference numerals correspond to parts labeled with equivalent unprimed numerals.

In the first embodiment, as shown in FIG. 5, the module contact 41 is portrayed as cylindrical and grasped by the socket contact 84. Alternatively, module contacts can have another shape and need not be grasped by the socket contact 84. For example, FIG. 9 shows a spherical module contact 41' and an alternative socket strip 82' in which the sheath 92', instead of the socket 84, grasps the module contact 41'. The material surrounding the hole in the sheath 92', instead of the contact 84', thus serves as the socket in this embodiment to secure the module 10 to the rail 71'. Additionally, in contrast to FIG. 5, the stiffening bar 81' in FIG. 9 is as wide as the groove 80' to provide a snug fit, and the socket strip 84' is narrower than the groove 80'. This enables the potting material 110' to engage the stiffening module 81' and both sides of the socket strip 82'.

FIG. 10 shows another alternative socket strip 82'. This differs from the configurations of FIGS. 5 and 9 in the following ways: The strip 82' of FIG. 10 neither receives nor secures the module contact 41'. The modules 10 are thus secured to the rail 71 only by the potting material 110. The contacts 41', 84' of both the module 10' and the strip 82' are outside the sheath 92'. The potting material engages both contacts 41', 84', surrounds the interface (point of contact) between the contacts 41', 84', and reaches the peripheral edge of the interface.

In the first embodiment, as shown in FIG. 6, the modules 10 are electrically connected in parallel. In another embodiment shown in FIG. 11, the modules 10 are connected in series. This can be achieved by flipping the axial orientation of every other module 10 in the array 5. Each anode contact 41 can then be electrically connected by an electrical line 90' to an adjacent cathode cell 22.

Figure 12:
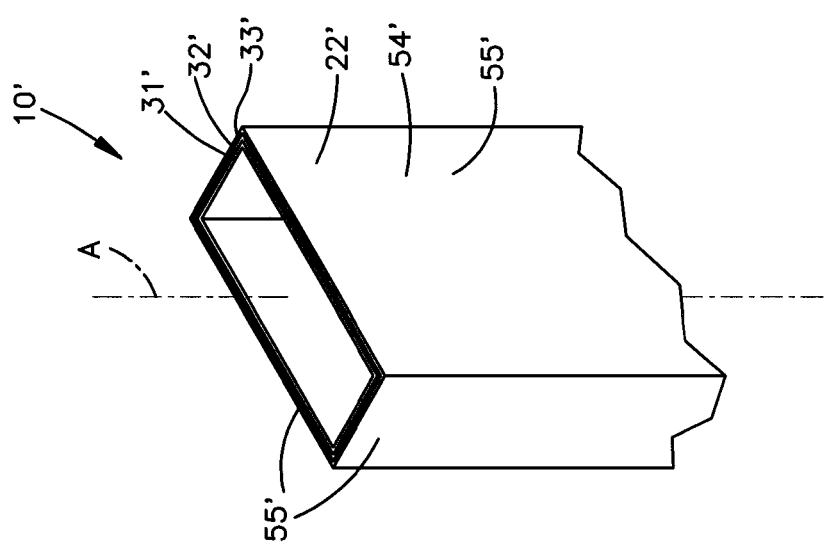

Although the photovoltaic surface 54 is preferably cylindrical as shown above, other shapes are possible as mentioned above. For example, FIG. 12 shows a module 10' (with its electrode contacts omitted for clarity) that has a tubular photocell 22' having conductive inner and outer layers 31' and 33' and a photovoltaic middle layer 32'. The middle layer 32' is tubular with a rectangular cross-section. It thus provides four contiguous orthogonal flat photovoltaic surface portions 55' that face away from the axis A in different directions and together extend fully about the axis A. Like the cylindrical photocell configuration described above, this rectangular configuration can photovoltaically generate electricity from light rays directed toward the module 10' from any radially-inward direction, even though not all such light rays could strike the respective surface portion 55' perpendicularly. Similarly, other choices of shape can be used for the outer protective sleeves that fit over the cells 22.

Figure 14:
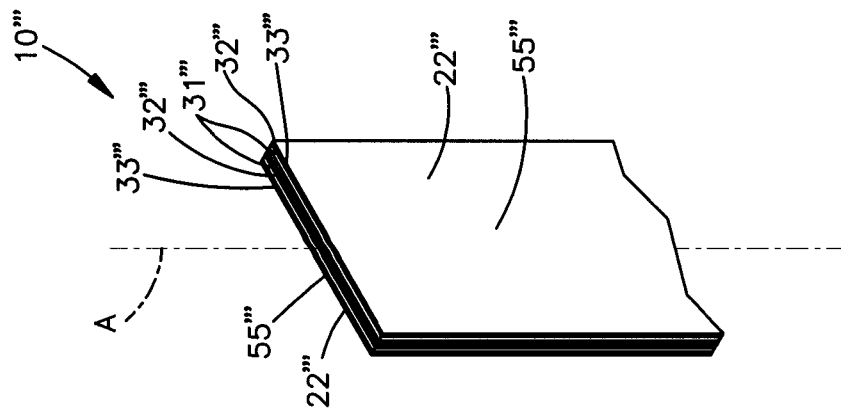
FIGS. 12-14 are perspective views of alternative modules.
Figure 13:
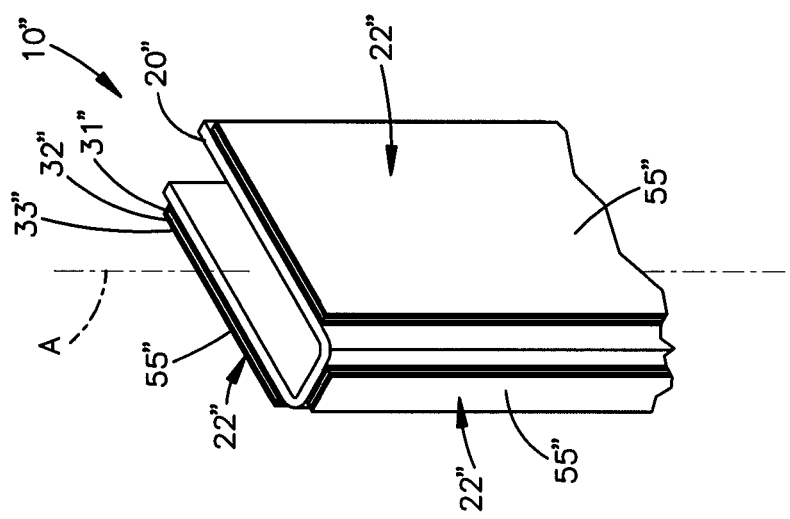

Each module 10 in the above example includes a single photovoltaic cell 22. Alternatively, each module 10 can have multiple cells. For example, FIG. 13 shows a module 10" having three separate cells 22" that together provide three separate orthogonal photovoltaic surface portions 55" that face away from the axis A in three different directions. FIG. 14 shows a module 10''' made of two photocells 22''' glued back-to-back to provide two separate flat photovoltaic surfaces 55''' facing away from each other and the axis A.

The module 10 can have one contiguous photovoltaic cell, or several photovoltaic cells connected in serial or in parallel. These cells can be made as a monolithic structure that has the plurality of cells scribed into the photovoltaic material during the semiconductor manufacturing stage, as exemplified in U.S. patent application Ser. No. 11/378,835, which is hereby incorporated by reference herein. Further, as noted above, the cross-sectional geometry of such an elongated module need not be limited to the cylindrical embodiment described above.

For example, the module cross-section can by polygonal, with a regular or irregular closed shape.

In the first embodiment, each photocell 22 is sealed in a transparent protective tube 24 (FIG. 3A). Alternatively, the tube 24 can be replaced with a protective coating or omitted entirely. The potting material 110 could then form a seal with the coating or with the photocell 22 itself.

In the first embodiment, the rail 71 has an single elongated indentation 80 that receives all of the modules 10. Alternatively, the rail 71 can have multiple bore-shaped indentations, not necessarily elongated, each groove containing one socket to mechanically secure and/or electrically one module.

FIG. 15 shows a two-dimensional array formed from three one-dimensional arrays 5, 5', 51" stacked one over the other. This can be achieved by stacking three panels like the panel 1 (FIG. 1) described above. Or by fitting three socket strips 82 side-by-side in a common wide groove 80 and filling the groove 80 with the potting material 110. The reflective surface 14 is mounted behind the bottom array 5. A light ray 130' can be reflected any number of times from any number of photovoltaic surfaces 54 of the three arrays 5, 5', 5" and from the reflective surface 14. The increased number of cell surfaces 54 being exposed to the light ray 130' increases efficiency of converting that light ray 130' to electricity.

The apparatus 1 described above thus provides examples of the following features: In a set of photovoltaic modules, the modules are configured to photovoltaically generate electricity from light. Each module is elongated along an axis and has first and second axially opposite ends. An end rail has a groove into which the first end of each module is potted in place with potting material.

Preferably, the potting material forms a seal about each module fully about the circumference of the module. The seal is hermetic. A socket in the groove is covered by the potting material and fixes the position of the first end of the first module in the end rail.

Preferably, sockets in the groove are covered by the potting material and spaced apart along the length of the first rail. Each socket fixes the position of the first end of a respective one of the modules. The sockets are parts of a socket strip that is seated in the groove and covered by the potting material. Each electrical socket contact in the groove is covered by the potting material and contacts an output contact of a respective module to conduct electricity from the module. The potting material engages the socket contact. The potting material surrounds an interface between the socket contact and the output contact.

In this example, the potting material is electrically insulating. The modules are electrically-interconnected by an electrical line that is covered by the potting material. A second end rail has a second groove, and potting material in the second groove fixes the second ends of the modules in the second groove. The modules of the set can be in a one-dimensional array or in a two-dimensional array. The modules are fixed in a mutually parallel configuration. Each module is configured to photovoltaically generate electricity from light directed toward the module from any radially-inward direction.

In this example, a photovoltaic module is elongated along an axis and has first and second axially opposite ends. The module is configured to photovoltaically generate electricity from light directed toward the module from any radially-inward direction. A securing structure has an indentation into which the first end of the module is potted in place with potting material.

The scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. A solar panel apparatus comprising:
a set of photovoltaic modules configured to photovoltaically generate electricity from light, each module elongated along an axis and having first and second axially opposite ends; and
an end rail having a groove into which the first end of each module is potted in place with potting material, the end rail and the potting material being separate components wherein a flexible sheath is inserted in the end rail such that the flexible sheath is disposed between the bottom of the groove and the potting material,
wherein the set of photovoltaic modules are electrically-interconnected by an electrical line that is covered by the potting material.

2. The apparatus of claim 1 wherein the groove is elongated along the length of the rail.

3. The apparatus of claim 1 wherein the potting material forms a seal about each module fully about the circumference of the module.

4. The apparatus of claim 3 wherein the seal is hermetic.

5. The apparatus of claim 1 further comprising a socket in the groove, covered by the potting material and fixing the position of the first end of the at least one module in the end rail.

6. The apparatus of claim 1 further comprising sockets that are in the groove, covered by the potting material and spaced apart along the length of the first rail, each socket fixing the position of the first end of a respective one of the modules.

7. The apparatus of claim 6 wherein the sockets are parts of a socket strip that is seated in the groove and covered by the potting material.

8. The apparatus of claim 1 further comprising an electrical socket contact that is in the groove, covered by the potting material and contacting an output contact of a respective module to conduct electricity from the module.

9. The apparatus of claim 8 wherein the potting material engages the socket contact.

10. The apparatus of claim 8 wherein the potting material surrounds an interface between the socket contact and the output contact.

11. The apparatus of claim 1 wherein the potting material is electrically insulating.

12. The apparatus of claim 1 further comprising a second end rail with a second groove, wherein potting material in the second groove fixes the second ends of the modules in the second groove.

13. The apparatus of claim 1 wherein the modules are in a one-dimensional array.

14. The apparatus of claim 1 wherein the modules are in a two-dimensional array.

15. The apparatus of claim 1 wherein the modules are fixed in a mutually parallel configuration.

16. The apparatus of claim 1 wherein each module is configured to photovoltaically generate electricity from light directed toward the module from any radially-inward direction.

17. The apparatus of claim 1 wherein the groove is bounded by two opposing side surfaces and a bottom surface extending from one of the side surfaces to the other, the groove has an opening opposite the bottom surface, the modules' axes extend through both the groove opening and the bottom surface, and the modules have output contacts located between the side surfaces.

18. The apparatus of claim 17 wherein electrical output contacts are located axially between the bottom surface and a portion of the potting material.

19. A solar panel apparatus comprising:
a set of photovoltaic modules configured to photovoltaically generate electricity from light, each module elongated along an axis and having first and second axially opposite ends and an output contact extending from said first end; and
an end rail having a groove into which the first end of each module is potted in place with potting material, the end rail and the potting material being separate components, wherein said output contact extends into the groove of the end rail and is encased by said potting material to form a hermetic seal about the output contact wherein a flexible sheath is inserted in the end rail such that the flexible sheath is disposed between the bottom of the groove and the potting material,
wherein the set of photovoltaic modules are electrically-interconnected by an electrical line that is covered by the potting material.

* * * * *